US012441122B2

(12) United States Patent
Ito et al.

(10) Patent No.: US 12,441,122 B2
(45) Date of Patent: Oct. 14, 2025

(54) LIQUID DISCHARGE APPARATUS AND IMPRINT APPARATUS

(71) Applicant: CANON KABUSHIKI KAISHA, Tokyo (JP)

(72) Inventors: Sari Ito, Tochigi (JP); Noriyasu Hasegawa, Tochigi (JP); Yuichi Iwasaki, Tochigi (JP); Takahiro Hosokawa, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 190 days.

(21) Appl. No.: 18/172,965

(22) Filed: Feb. 22, 2023

(65) Prior Publication Data

US 2023/0264480 A1 Aug. 24, 2023

(30) Foreign Application Priority Data

Feb. 24, 2022 (JP) ................................ 2022-027006

(51) Int. Cl.

| | |
|---|---|
| ***B41J 2/175*** | (2006.01) |
| ***B41J 2/135*** | (2006.01) |
| ***B41J 2/18*** | (2006.01) |
| ***B41J 2/185*** | (2006.01) |
| ***B41J 11/00*** | (2006.01) |
| ***B41J 29/38*** | (2006.01) |
| *B41J 17/00* | (2006.01) |

(52) U.S. Cl.

CPC .......... *B41J 2/17596* (2013.01); *B41J 2/135* (2013.01); *B41J 2/175* (2013.01); *B41J 2/17556* (2013.01); *B41J 2/17563* (2013.01); *B41J 2/18* (2013.01); *B41J 2/185* (2013.01); *B41J 11/002* (2013.01); *B41J 29/38* (2013.01); *B41J 17/00* (2013.01)

(58) Field of Classification Search

CPC ........ B41J 2/17596; B41J 2/135; B41J 2/175; B41J 2/17556; B41J 2/17563; B41J 2/18; B41J 2/185; B41J 11/002; B41J 29/38; B41J 17/00

See application file for complete search history.

(56) References Cited

U.S. PATENT DOCUMENTS

| | | | | |
|---|---|---|---|---|
| 2012/0069069 | A1* | 3/2012 | Suzuki | B41J 2/2142 347/9 |
| 2016/0229194 | A1* | 8/2016 | Araki | B41J 2/175 |
| 2018/0301331 | A1* | 10/2018 | Yoshida | H01L 21/0273 |

FOREIGN PATENT DOCUMENTS

| | | | | |
|---|---|---|---|---|
| JP | 2015147365 A | | 8/2015 | |
| JP | 2018167512 A | * | 11/2018 | B41J 2/14 |
| TW | 201522088 A | | 6/2015 | |

* cited by examiner

*Primary Examiner* — Yaovi M Ameh

(74) *Attorney, Agent, or Firm* — Canon U.S.A., Inc. IP Division

(57) ABSTRACT

A liquid discharge apparatus has a storage portion configured to store a discharged material, a discharge port configured to communicate with the storage portion and discharge the discharged material stored in the storage portion, and a pressure control device configured to control a pressure of the discharged material stored in the storage portion. The pressure control device controls the pressure of the discharged material to shift from a first negative pressure state, to a second negative pressure state of a greater negative pressure than the first negative pressure state, and then to a third positive pressure state.

30 Claims, 8 Drawing Sheets

| | | FIRST CONTROL VALVE | SECOND CONTROL VALVE | THIRD CONTROL VALVE |
|---|---|---|---|---|
| S1 | NORMAL | OP | CL | CL |
| S2 | SUCTION | CL | OP | CL |
| S3 | PRESSURE | CL | CL | OP |

| | | FIRST CONTROL VALVE | SECOND CONTROL VALVE | THIRD CONTROL VALVE | FOURTH CONTROL VALVE |
|---|---|---|---|---|---|
| S11 | NORMAL | OP | CL | CL | CL |
| S12 | SUCTION PREPARATIONS | OP | CL | OP | CL |
| S13 | SUCTION | CL | OP | CL | CL |
| S14 | PRESSURIZATION PREPARATIONS | CL | CL | CL | OP |
| S15 | PRESSURE | CL | OP | CL | CL |

LIQUID DISCHARGE APPARATUS AND IMPRINT APPARATUS

BACKGROUND

Field

The present disclosure relates to a liquid discharge apparatus.

Description of the Related Art

Some liquid discharge apparatuses that discharge liquid are known to use a cartridge that integrates a discharge head, which discharges liquid from a plurality of discharge ports, with a storage receptacle that stores the liquid. Such a liquid discharge apparatus includes a maintenance mechanism that maintains and restores the discharge performance of a discharge unit by eliminating clogs in the discharge ports provided in the discharge unit, removing foreign matter that has adhered to a discharge surface in which the discharge ports are formed, and the like.

Japanese Patent Laid-Open No. 2015-147365 describes providing a wiper that moves along the discharge surface to wipe away residual liquid on the discharge surface and describes cleaning the inside of the discharge ports by ejecting liquid from each of the discharge ports in the discharge unit.

However, although the method described in Japanese Patent Laid-Open No. 2015-147365 can expel foreign matter along with the liquid present on the discharge port surface, the method cannot effectively remove foreign matter within the discharge ports and in a head flow path. In addition, in Japanese Patent Laid-Open No. 2015-147365, because the cross-sectional area of the discharge ports is smaller than the cross-sectional area of the flow path, foreign matter which is present in the flow path and which is larger than the discharge ports cannot be removed.

SUMMARY

The present disclosure provides a liquid discharge apparatus capable of more reliably removing foreign matter within discharge ports and on a discharge port surface.

According to a first aspect of the present invention, there is provided a liquid discharge apparatus having a storage portion configured to store a discharged material; a discharge port configured to communicate with the storage portion and discharge the discharged material stored in the storage portion; and a pressure control device configured to control a pressure of the discharged material stored in the storage portion. The pressure control device controls the pressure of the discharged material to shift from a first negative pressure state, to a second negative pressure state of a greater negative pressure than the first negative pressure state, and then to a third positive pressure state.

According to a second aspect of the present invention, there is provided an imprint apparatus having the liquid discharge apparatus described above; and a forming device configured to press a mold having a pattern against an imprint material applied to a substrate by the liquid discharge apparatus, and then release the mold from the imprint material after curing the imprint material.

Further features of the present disclosure will become apparent from the following description of exemplary embodiments with reference to the attached drawings.

DESCRIPTION OF THE EMBODIMENTS

Figure 1A:
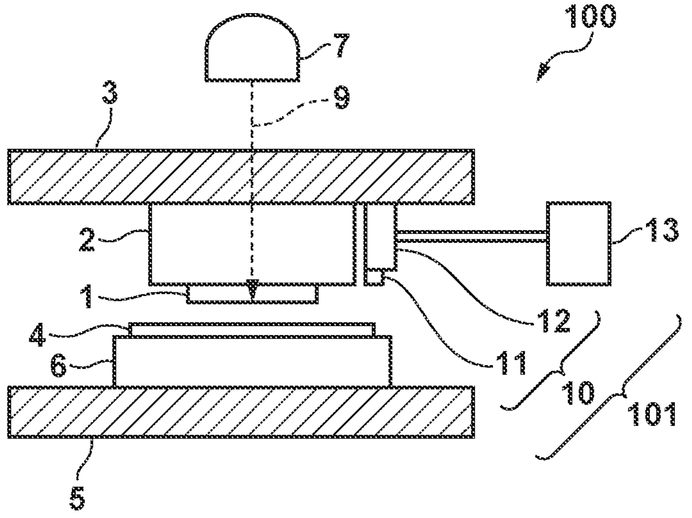
FIGS. 1A to 1C are diagrams illustrating the configuration of an imprint apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1B:
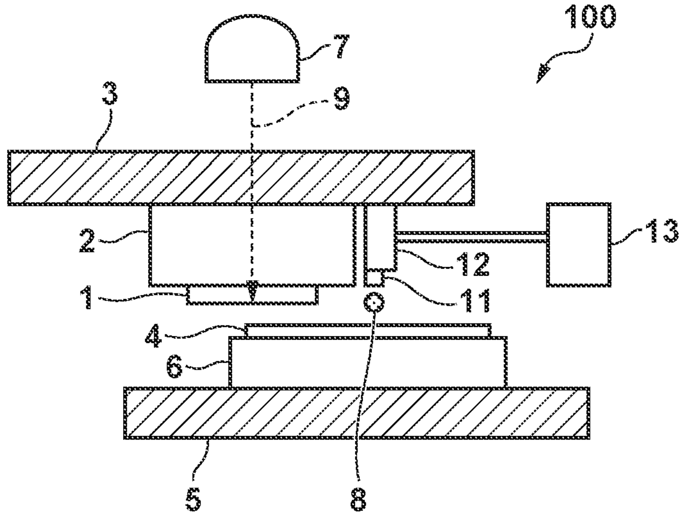
Figure 1C:
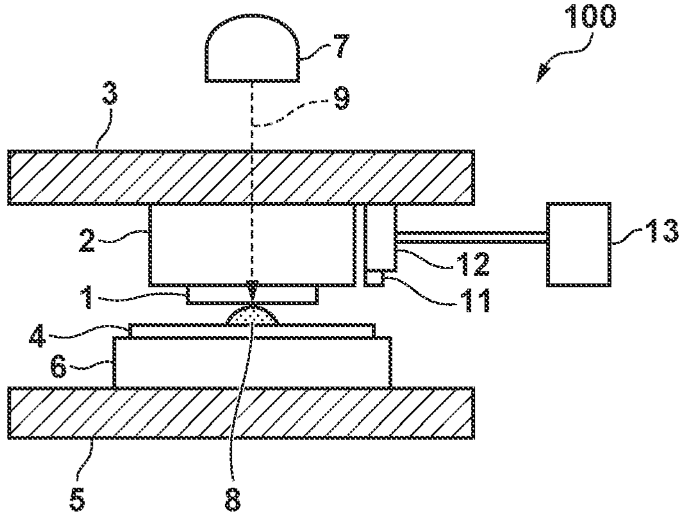

FIGS. 1A to 1C are diagrams illustrating the configuration of an imprint apparatus according to a first embodiment of the present disclosure. The present embodiment will describe an example of an apparatus that uses a UV-curable resin as an imprint material and cures the UV-curable resin by irradiating the resin with UV light. However, the imprint material and the method of curing are not limited thereto. For example, a light-curing resin may be cured by a light irradiation apparatus irradiating the resin with light of a wavelength aside from UV light, or a thermosetting resin may be used and cured with heat.

In FIGS. 1A to 1C, an imprint apparatus 100 is configured to include a liquid discharge system 101, a stage 6 supported by a base frame 5, a mold 1, a mold drive mechanism 2 held by a structure 3, and a UV irradiation apparatus 7.

The liquid discharge system 101 includes a liquid discharge apparatus 10 and a pressure control unit 13. The liquid discharge apparatus 10 includes a discharge portion 11 that discharges the imprint material, and a storage portion 12 that stores the imprint material.

As illustrated in FIG. 1B, a substrate 4 is placed on the stage 6, and an imprint material 8 is discharged (applied) onto the substrate 4 from the discharge portion 11. As illustrated in FIG. 1C, the imprint material 8 discharged onto the substrate 4 is brought into contact with a mold 1, which has a fine non-planar pattern or the like, and this causes the imprint material 8 to fill the non-planarities in the mold 1. In this state, the imprint material 8 is irradiated with UV light 9 from the UV irradiation apparatus 7 to cure the imprint material 8. When the mold 1 is moved upward (released), the imprint material 8 is formed with the pattern of the mold 1 transferred thereto. The pattern is formed on the imprint material 8 in this manner.

The liquid discharge apparatus 10 is removable, and when all the imprint material 8 therein has been consumed, the imprint apparatus 100 can be used immediately by replacing the old liquid discharge apparatus 10 with a new one.

The stage 6 can move on base frame 5 while holding the substrate 4. The mold drive mechanism 2, which drives the mold 1 up and down, is held by the structure 3, and can bring the mold 1 into contact with the imprint material 8 discharged onto the substrate 4.

The UV irradiation apparatus 7 is disposed above the mold 1, and irradiates the imprint material 8 with the UV light 9 through the mold 1. The UV light 9 may be generated from a light source such as a halogen lamp that generates i- or g-rays, for example. The UV irradiation apparatus 7 may also have a function for focusing and shaping the light generated by the light source.

Imprint operations performed using the imprint apparatus 100 will be described in detail next.

First, the substrate 4 is placed on the stage 6. The substrate 4 is moved to below the discharge portion 11 of the liquid discharge apparatus 10 by the stage 6. Then, the imprint material 8 is discharged onto the substrate 4 from the discharge portion 11 while moving the stage 6.

Next, the part of the substrate 4 onto which the imprint material 8 has been discharged is moved to below the mold 1 by the stage 6. Furthermore, the mold 1 is lowered by the mold drive mechanism 2, which brings the mold 1 and the substrate 4 into close proximity. In this state, an alignment mark on the mold 1 and an alignment mark on the substrate 4 are caused to overlap using an alignment scope or the like, and the relative positions of the two are adjusted.

After the relative positions are adjusted, the mold 1 is further lowered in the direction of the substrate 4 by the mold drive mechanism 2, bringing the imprint material 8 into contact with the mold 1. This state is maintained to cause the imprint material 8 to fill the non-planar parts of the mold 1. Then, the UV light 9 is emitted from the UV irradiation apparatus 7, and the imprint material 8 is irradiated by the UV light 9 passing through the mold 1. This causes a light curing reaction in the imprint material 8, which cures the imprint material 8.

Finally, the mold 1 is raised by the mold drive mechanism 2 and separated from the cured imprint material 8.

Through the above-described process, a patterned imprint material 8 can be formed on the substrate 4. The imprint apparatus used to manufacture a semiconductor may form a pattern over the entire region of the substrate 4, and in this case, the series of imprint operations is repeated while changing the region of the substrate 4 on which the operations are performed.

Figure 2:
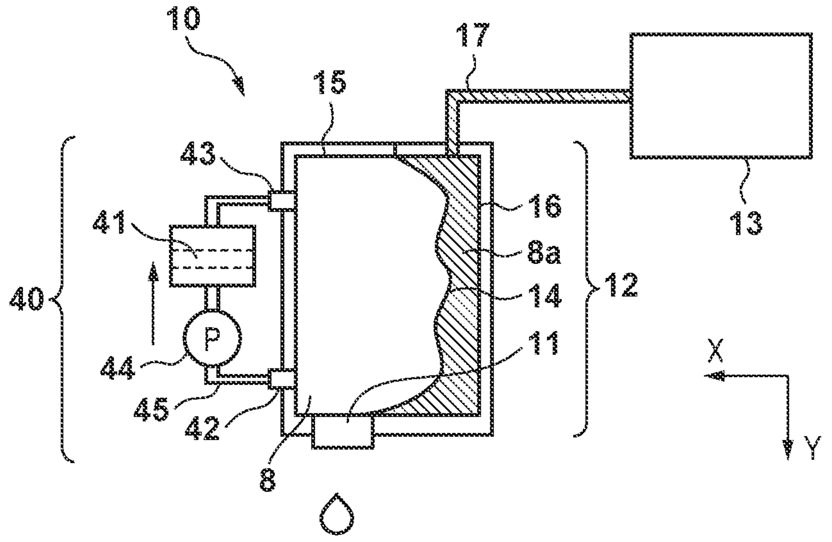
FIG. 2 is a diagram illustrating a liquid discharge apparatus according to the first embodiment.

Next, FIG. 2 is a diagram illustrating the configuration of the liquid discharge apparatus 10.

The liquid discharge apparatus 10 is configured mainly to include the discharge portion 11, a storage receptacle 12 that stores a discharged material 8 (liquid), and the pressure control unit 13. A separation membrane 14, which divides the space within the storage portion and is formed from a flexible member, is provided within the storage receptacle 12, which is capable of storing liquid. The separation membrane 14 preferably has a thickness greater than or equal to 10 μm and less than or equal to 200 μm, and is preferably formed from a material having low permeability with respect to liquids and gases. The separation membrane 14 can be formed from a film of a fluoropolymer material, such as PFA, or a composite multilayer film combining a fluoropolymer material and a plastic material, for example.

The discharged material 8 is stored in a storage portion 15 on one of the sides of the storage receptacle 12 partitioned by the separation membrane 14, and a filling liquid **8*a* is stored in a storage portion 16 on the other side. The storage portion 15 and the storage portion 16 are separated by the separation membrane 14. The storage portion 16 is connected to the pressure control unit 13 by a tube 17, and the storage portion 15 is connected to the discharge portion 11**.

The pressure control unit 13 includes a filling liquid tank, tubes, a pressure sensor, pumps, valves, and the like, and is configured to be capable of controlling the pressure within the storage portion 16. By controlling the pressure of the filling liquid **8*a* within the storage portion 16 using the pressure control unit 13, the pressure of the discharged material 8 within the storage portion 15 can be controlled through the separation membrane 14**.

As the discharged material 8 is repeatedly discharged from the discharge portion 11, the discharged material 8 within the storage portion 15 is consumed and decreases, causing the separation membrane 14 to deform gradually in a +X direction. As the separation membrane 14 deforms, the storage portion 16 is refilled with the filling liquid **8*a* from the filling liquid tank by the pressure control unit 13. This stabilizes the shape of the meniscus in the discharge portion 11, which makes it possible to discharge the discharged material 8** with good reproducibility.

A circulating unit 40 will be described next. The circulating unit 40 includes a flow path 45 that connects a fitting 42, a pump 44, a filter 41 that filters the discharged material 8, and a fitting 43, and is connected to the storage receptacle 12 by the fitting 42 and the fitting 43. By driving the pump 44, the discharged material 8 within the storage portion 15 can be sucked into the flow path 45 through the fitting 43, and the discharged material, which has had foreign matter removed by the filter 41, can be returned to the storage portion 15 through the filter 41 and the fitting 43. This circulating unit 40 makes it possible to remove foreign matter mixed into the discharged material 8 within the storage portion 15.

In light of the possibility of foreign matter entering the discharged material due to debris emitted from the pump 44, it is preferable that the filter 41 be disposed downstream from the pump 44. Although it is preferable that the pump 44 be provided within the flow path 45, the pump 44 may be provided outside the flow path.

Figure 3:
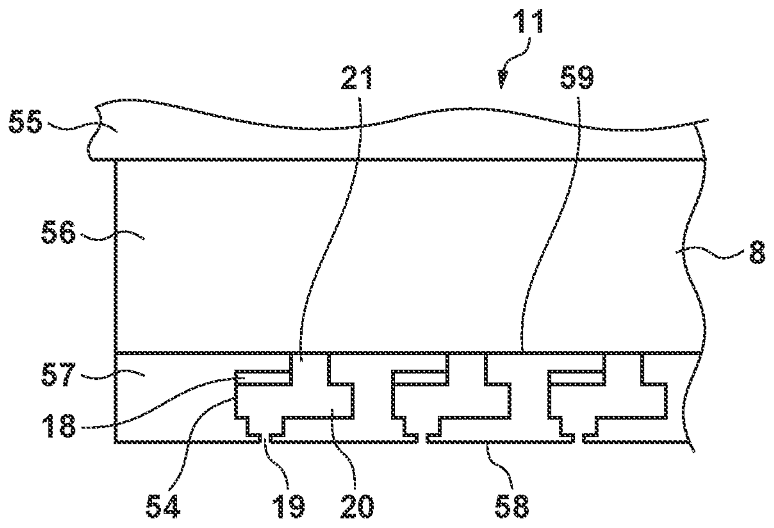
FIG. 3 is an enlarged view of a liquid discharge unit.

FIG. 3 is an enlarged cross-sectional view of the discharge portion 11. The discharge portion 11 includes a common liquid chamber 56 and a module substrate 57. The module substrate 57 is provided with a supply port 21 that supplies the discharged material 8 to the module substrate 57, a plurality of discharge nozzles 54 including discharge ports 19 capable of discharging the discharged material 8, and an energy generating element 18 that is provided within each discharge nozzle 54 and that generates energy for discharging the discharged material 8.

Here, a surface of the module substrate 57 in which the supply port 21 is provided will be called a "supply port-side surface 59", and a surface in which the discharge ports 19 are provided will be called a "discharge surface 58". An opening area of the discharge port 19 is smaller than an opening area of the supply port 21, and has the smallest cross-sectional area in the flow path within the discharge nozzle 54.

A piezoelectric element, a heat resistor, and the like can be given as examples of the energy generating element 18.

Materials rich in resin are often used as the discharged material 8, and thus a piezoelectric element is used as the energy generating element 18 here. The supply port 21 communicates with the discharge port 19 within the module substrate 57. By controlling the energy generating element 18 using a controller (not shown), the discharged material 8 supplied from the supply port 21 to a small liquid chamber 20 located between the energy generating element 18 and the discharge port 19 is discharged from the discharge port 19. The discharge portion 11 is preferably a discharge head such as that used in an ink jet head or the like. Additionally, a control valve or the like may be used to control the supply and stopping of the discharged material.

The detection of clogs in the discharge port 19 due to foreign matter (a discharge anomaly) will be described next. The energy generating element 18 can also be used to determine a state of clogging in the discharge port 19 (discharge anomaly detection). In the liquid discharge apparatus according to the present embodiment, the volume of the small liquid chamber 20 is caused to vary (called an "inspection oscillation" hereinafter), imparting vibrations on the discharged material 8 within the small liquid chamber 20, by applying a voltage of 30% to 70% of the voltage applied to the energy generating element 18 when discharging the discharged material 8. If the voltage fluctuation range is of this magnitude, the meniscus of the discharge port 19 will not break and discharged material 8 will not be discharged from the discharge portion 11, even if the discharged material 8 within the small liquid chamber 20 vibrates. On the other hand, vibration in the small liquid chamber 20 generates back electromotive force in the energy generating element 18, and if the discharge port is blocked by accumulated matter or if bubbles enter the small liquid chamber 20, a waveform different from the standard state (the waveform when a meniscus is formed) can be detected.

Normally, a liquid discharge apparatus has a normal discharge position for discharging liquid toward a discharge target, and a standby position for performing maintenance on the liquid discharge apparatus. The liquid discharge apparatus is mounted on a stage (not shown), and the liquid discharge apparatus is moved between the discharge position and the standby position. Detecting clogs in the discharge port 19 while in the standby position makes it possible to suppress erroneous discharges in the discharge position caused by erroneous operations in the inspection oscillation. At a timing when discharge operations are not being performed, the state of clogging in the discharge port 19 is inspected through the inspection oscillation by the energy generating element 18, and if an anomaly is found, the operations shift to a cleaning process. If no anomaly is found, the apparatus is returned to the discharge position and desired discharging is performed.

Although defective discharge nozzles are described here as being detected through the inspection oscillation, defective discharge nozzles may instead be detected by a landing inspection apparatus (not shown) measuring whether or not the material has landed, the landing positions, speeds, amounts, and the like.

Although one end of the discharge portion 11 is open to the atmosphere by the discharge port 19, the diameter of the discharge port 19 is several μm to several tens of μm, and the discharged material 8 therefore does not leak out under its own weight due to the capillary phenomenon. The liquid surface near the discharge port 19 is kept in a concave-shaped, so-called "meniscus" state.

The cleaning process will be described next. The cleaning process is performed when it is determined, through the inspection oscillation, that foreign matter is adhering to the discharge port 19. The cleaning process is also performed in the standby position, similar to when detecting a clogged discharge port 19. When it is determined that foreign matter is adhering to the discharge port 19, the pressure control unit 13 is set to a negative pressure greater than a meniscus force, e.g., −30 kPa. This sucks the discharged material 8 in the discharge port 19 and the small liquid chamber 20, and foreign matter adhering to the vicinity thereof, from the discharge port 19 together with the atmosphere in the vicinity as a gas-liquid mixture, and moves the adhered foreign matter into the storage portion 15. The pump 44 of the circulating unit 40 described above is then driven to remove the foreign matter using the filter 41. Then, by setting the pressure control unit 13 to a positive pressure, e.g., +30 kPa, the air remaining in the small liquid chamber 20, the discharge port 19, and the like is expelled together with the discharged material 8. The unit is then set to the normal, slightly negative pressure state at which the meniscus state of the discharged material 8 can be maintained.

Figures 4A, 4B, 4C, 4D, 4E:
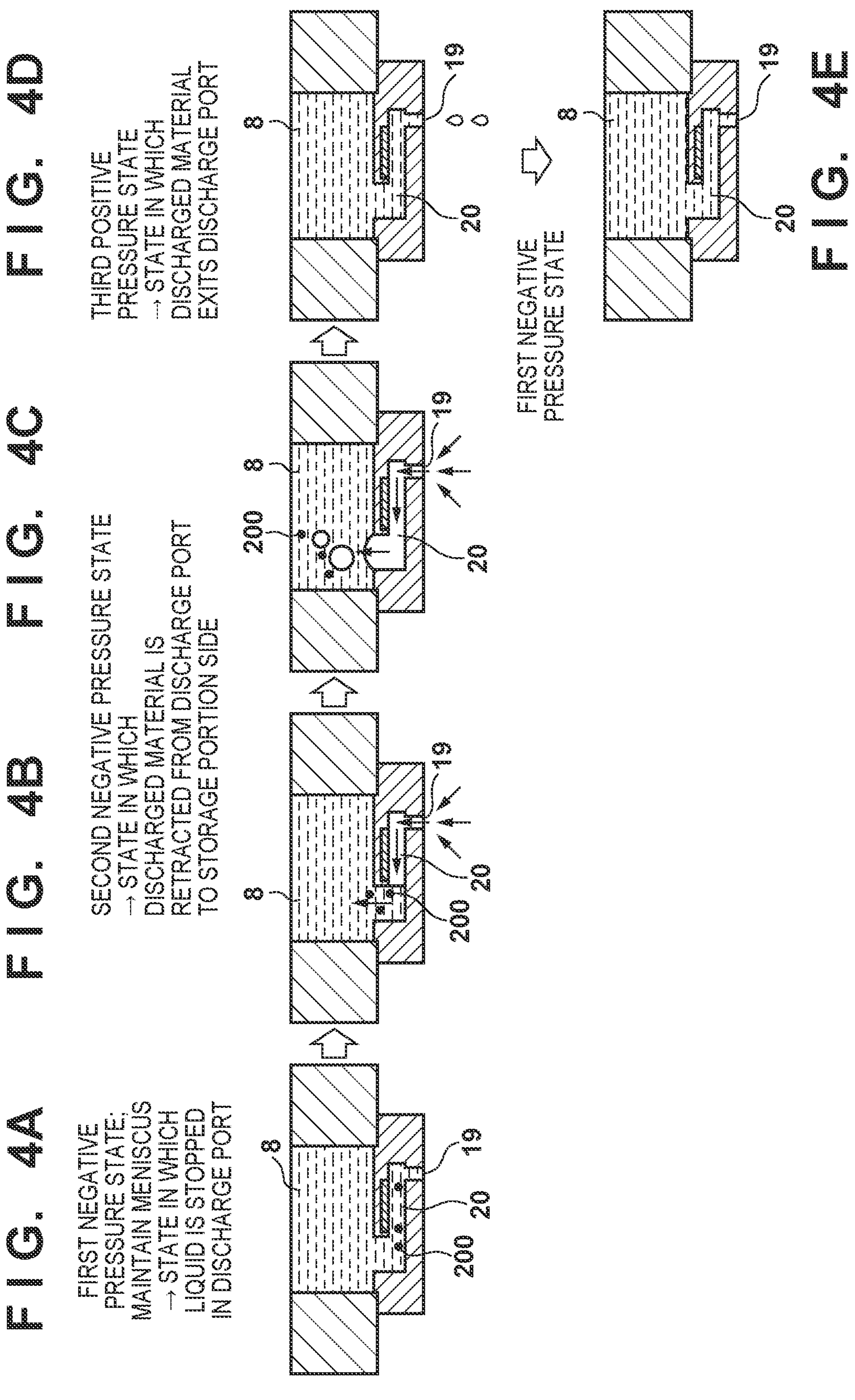
FIGS. 4A to 4E are diagrams illustrating changes in pressure during a cleaning process.

FIGS. 4A to 4E are diagrams illustrating changes in the pressure during the cleaning process. First, before the cleaning process, as illustrated in FIG. 4A, the pressure control unit 13 maintains a first negative pressure state (the normal, slightly negative pressure state) at which a stable meniscus can be maintained in the discharged material 8 at the discharge port 19. If foreign matter 200 adheres to the discharge port 19, as illustrated in FIGS. 4B and 4C, the pressure control unit 13 produces a second negative pressure state in which the pressure is greater than in the first negative pressure state (greater than the meniscus force), such as −30 kPa, for example. This sucks the discharged material 8 in the discharge port 19 and the small liquid chamber 20, and the foreign matter 200 adhering to the vicinity thereof, into the storage portion 15 together with the atmosphere in the vicinity thereof. After the foreign matter 200 is removed by the filter 41, the pressure control unit 13 generates a third positive pressure state, such as +30 kPa, for example, as illustrated in FIG. 4D. Through this, air remaining in the small liquid chamber 20, the discharge port 19, and the like can be expelled together with the discharged material 8. After these processes are completed, the pressure control unit 13 returns the pressure to the first negative pressure state (the normal, slightly negative pressure state), as illustrated in FIG. 4E. The meniscus of the discharged material 8 forms again in a stable manner as a result. The cleaning process is carried out in this manner.

In this manner, in addition to the slightly negative pressure state at which the meniscus of the discharged material 8 can be kept stable, the liquid discharge apparatus 10 of the present embodiment forms a negative pressure state in which foreign matter can be suctioned through gas-liquid mixing into the small liquid chamber 20 and the storage portion 15, and a positive pressure state in which the discharged material 8 can be expelled through the discharge port 19. The negative pressure state is regulated by a negative pressure source (pressure generation unit) 131, and the positive pressure state is regulated by a positive pressure source (pressure generation unit) 132 (see FIG. 5, described later).

Although the liquid discharge apparatus of the present embodiment is described having the pressure control unit 13 connected to the storage portion 15 by a single tube, the configuration is not limited thereto, and may be such that these elements are connected by a plurality of tubes to control the slightly negative pressure state, the negative pressure state, and the positive pressure state, respectively.

In the present embodiment, the pressure is set to −30 kPa and +30 kPa, but a suction volume and an expelling volume may be set such that each thereof is set to greater than or equal to 3 cc and less than or equal to 10 cc.

A degassing apparatus (not shown) may be disposed in the circulating unit 40, and the circulating unit 40 may be driven to remove bubbles sucked in with the discharged material 8 during suction.

After expelling the discharged material 8 from the discharge port 19, the discharge material 8 adhering to the discharge surface 58 is suctioned and removed using a suction nozzle (not shown). The suction nozzle, which is directly connected to the negative pressure source, is brought to 100 μm from the discharge surface 58, after which suction is started. The suction nozzle is then moved across the discharge surface 58 while maintaining the distance from the discharge surface 58 to suck out droplets remaining on the discharge surface 58. A suction opening gap of the suction nozzle is set to several tens of μm to several hundred μm, and the residual liquid momentarily causes liquid to be conducted between the discharge surface 58 and the tip of the suction nozzle. Therefore, a resin such as PTFE or the like is used as the material of the suction nozzle to prevent the risk of metal contamination.

After collecting the residual liquid on the discharge surface, the inspection oscillation is used to confirm that the foreign matter has been removed from the discharge port 19. If the foreign matter has not been removed, the cleaning process is performed again, and if recovery is not possible after multiple attempts, the liquid discharge apparatus 10 is replaced.

The liquid discharge apparatus 10 of the present embodiment is described as performing pressure control using the separation membrane 14 within the storage receptacle 12. However, the configuration may be such that a storage portion which stores only the discharged material 8 is provided, without the separation membrane 14, and the pressure of the discharged material 8 is controlled by the pressure control unit 13. In this case, the configuration may be such that foreign matter is removed by providing the circulating unit 40 described in the present embodiment within the pressure control unit 13.

In the field of ink jet recording apparatuses, other techniques are also used to keep the discharged material 8 at a set range of negative pressure to stabilize the meniscus shape in the discharge port 19 for the discharged material 8. For example, a method is known for configuring a porous material inside the storage portion to hold a liquid and use capillary force inside the porous material to create negative pressure. There is also a method of creating negative pressure in the storage portion by combining a mechanical element such as a spring with a balloon-shaped membrane, or using a control valve and air pressure to control negative pressure. In the present disclosure, the pressure in the storage portion may also be controlled through these methods.

Figure 5:
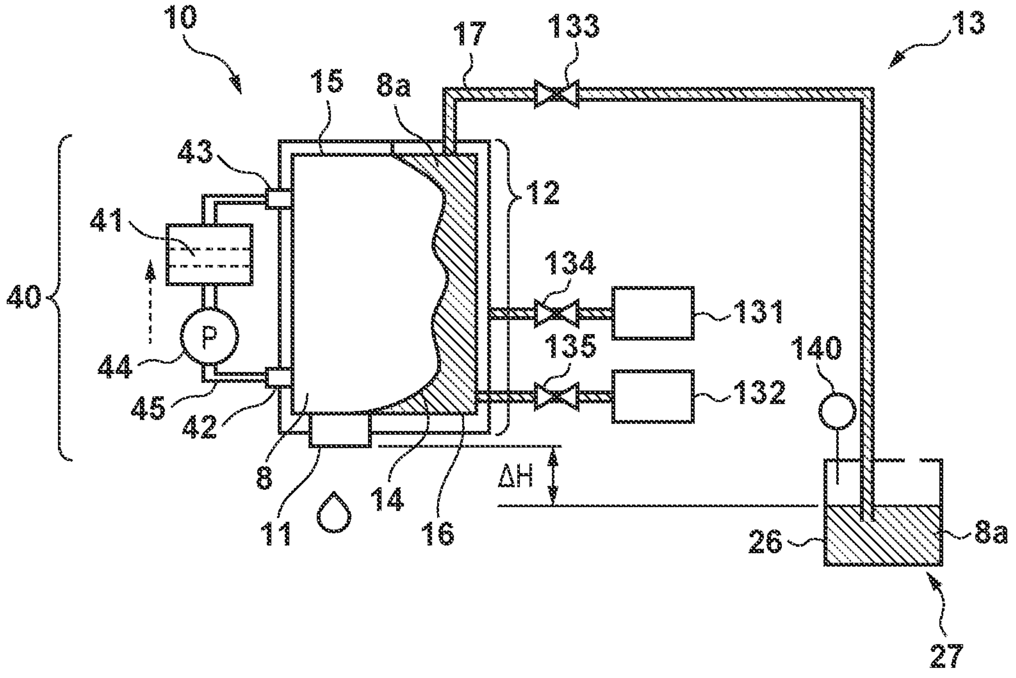
FIG. 5 is a diagram illustrating a pressure control unit according to the first embodiment.

FIG. 5 is a diagram illustrating the configuration of the pressure control unit 13 according to the present embodiment.

In the pressure control unit 13 of the present embodiment, a meniscus control unit 27, the negative pressure source 131, and the positive pressure source 132 are independently connected to the storage portion 16, as illustrated in FIG. 5. Additionally, a first control valve 133, a second control valve 134, and a third control valve 135 are respectively provided between those elements and the storage portion 16.

The filling liquid **8*a* is also stored in a supply tank 26, which constitutes part of the meniscus control unit 27, and thus the liquid surface of the filling liquid 8*a* is controlled to be at a lower position than the liquid surface at the discharge port 19. Specifically, the liquid surface of the filling liquid 8*a* is set to a position lower by ΔH relative to the discharge port 19. To maintain the state of the meniscus, the internal pressure of the discharged material 8 is preferably controlled to be 0.40±0.04 kPa lower than the external pressure (a slightly negative pressure), and ΔH is controlled to be 40±4 mm. For example, the discharged material 8** is approximately equal in density to water.

Figure 6:
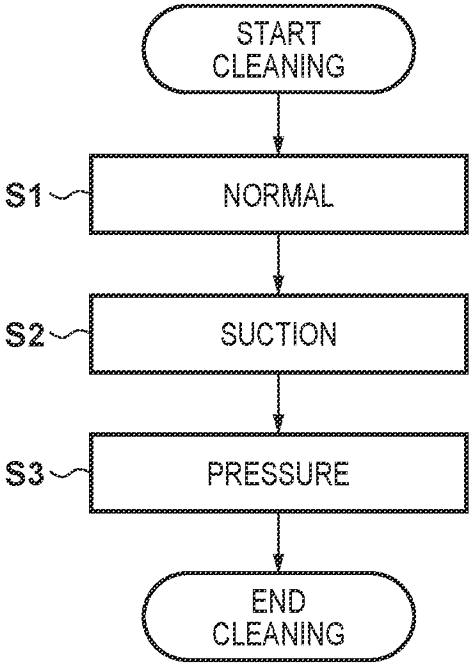
FIG. 6 is a flowchart illustrating cleaning operations according to the first embodiment.

The cleaning process according to the present embodiment will be described next. FIG. 6 is a flowchart illustrating operations in the cleaning process.

First, in step S1, which is a state of normal discharge operations by the liquid discharge apparatus 10 when cleaning operations for the discharge surface are not performed, the first control valve 133 is open, while the second control valve 134 and the third control valve 135 are closed.

From there, as already described, the liquid discharge apparatus 10 is moved to the standby position, and the state of clogging of the discharge port 19 is inspected through the inspection oscillation of the energy generating element 18 at a timing when discharge operations are not being performed. If an anomaly is found, the operations shift to the cleaning process. If no anomaly is found, the apparatus is returned to the discharge position and desired discharging is performed.

If an anomaly is found, in step S2, the negative pressure source 131 is set such that the pressure of the discharged material 8 is −30 kPa, which is greater than the meniscus force. The first control valve 133 is then closed, and the second control valve 134 is opened. Doing so temporarily reduces the pressure of the discharged material 8, which was previously being controlled to a range at which the meniscus at the discharge port 19 could be maintained, to −30 kPa. The meniscus is then broken by suctioning the gas-liquid mixture from the discharge port 19. At this time, foreign matter present in the discharge port 19 and the small liquid chamber 20 moves into the storage portion 15 along with the gas and liquid.

Next, in step S3, pressure is applied to the discharged material 8. After closing the second control valve 134 and opening only the third control valve 135, the pressure of the positive pressure source 132 is applied to the discharged material 8 through the filling liquid **8*a*, the small liquid chamber 20 is filled with the discharged material 8, and the discharged material 8 is expelled from the discharge port 19**.

The pump 44 of the circulating unit 40 is then driven to remove the foreign matter using the filter 41. Alternatively, this removal of foreign matter by the circulating unit 40 may be performed between step S2 and step S3. The unit is then set to return to the normal, slightly negative pressure state at which the meniscus state of the discharged material 8 can be maintained.

Second Embodiment

The first embodiment described a configuration in which a slightly negative pressure state in which the state of the meniscus of the discharged material 8 can be stably maintained, a negative pressure state in which the small liquid chamber 20 and the storage portion 15 are suctioned as a gas-liquid mixture, and a positive pressure state in which the discharged material 8 is expelled from the discharge port 19 are controlled by pressure sources independently connected to the storage portion 16. In contrast, in the present embodiment, only one tube connects the storage portion 16 and the pressure control unit 13. This makes it possible to reduce the size of the apparatus and simplify the design and production.

Additionally, in the first embodiment, the configuration is such that the negative pressure source 131 and the positive pressure source 132 are each switched by a single control valve. In contrast, in the present embodiment, the configuration is such that another control valve is provided ahead of each of the stated control valves, and the pressure is changed at once by opening the control valves from a state in which the pressure between the control valves is reduced or expanded. This improves the responsiveness of the pressure control.

Figure 7:
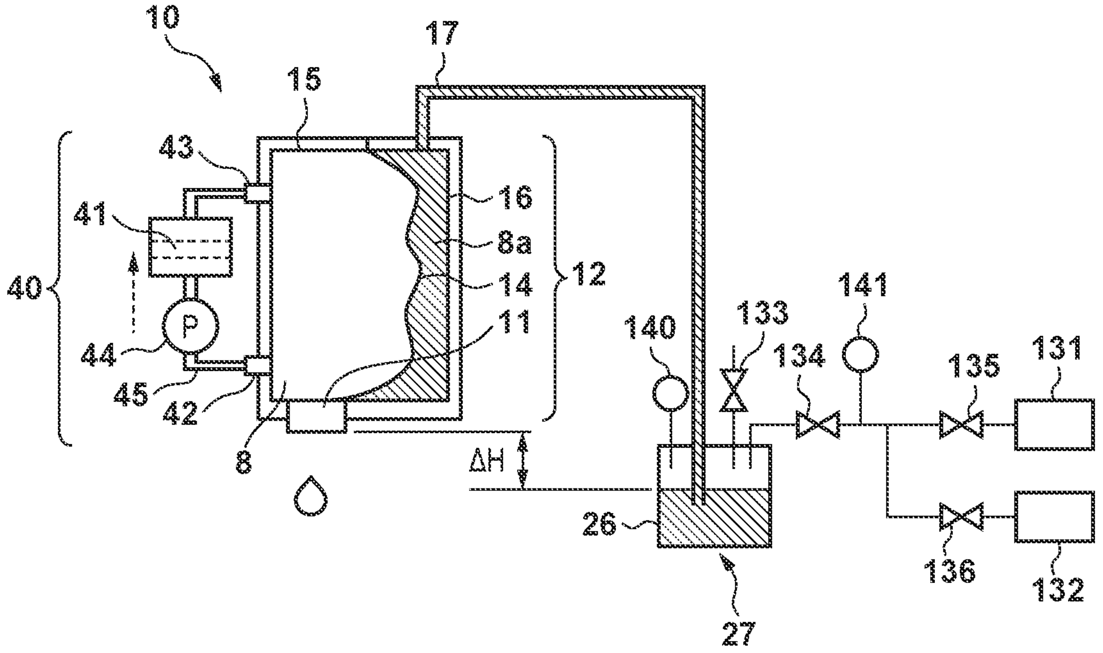
FIG. 7 is a diagram illustrating a pressure control unit according to a second embodiment.

FIG. 7 is a diagram illustrating the configuration of the pressure control unit 13 according to the present embodiment.

In the present embodiment, the negative pressure source 131 and the positive pressure source 132 are connected to the meniscus control unit 27, as illustrated in FIG. 7. The negative pressure source 131 and the positive pressure source 132 are provided in parallel, and the third control valve 135 and a fourth control valve 136 are connected to those sources, respectively. In addition, the second control valve 134 is provided between (i) the third control valve 135 and the fourth control valve 136 and (ii) the meniscus control unit 27. The first control valve 133 is provided in the meniscus control unit 27.

Figure 8:
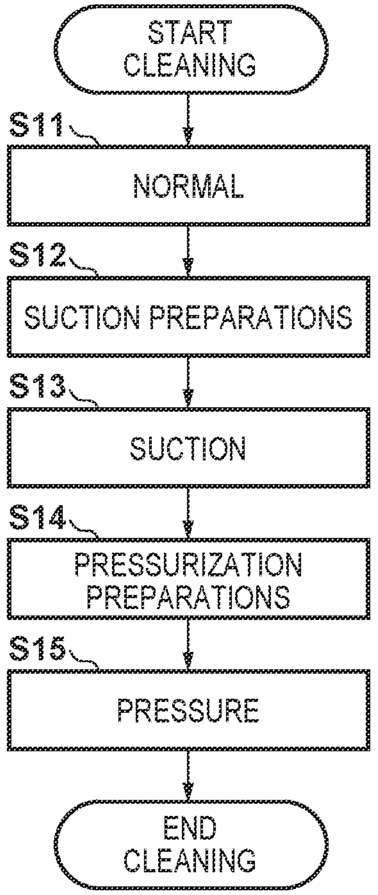
FIG. 8 is a flowchart illustrating cleaning operations according to the second embodiment.

The cleaning process according to the present embodiment will be described next. FIG. 8 is a flowchart illustrating operations in the cleaning process.

First, in step S11, which is a state of normal discharge operations by the liquid discharge apparatus 10 when cleaning operations for the discharge surface are not performed, the first control valve 133 is open, while the second control valve 134, the third control valve 135, and the fourth control valve 136 are closed.

From there, as already described, the liquid discharge apparatus 10 is moved to the standby position, and the state of clogging of the discharge port 19 is inspected through the inspection oscillation of the energy generating element 18 at a timing when discharge operations are not being performed. If an anomaly is found, the operations shift to the cleaning process. If no anomaly is found, the apparatus is returned to the discharge position and desired discharging is performed.

In the cleaning process, suction preparations are performed in step S12. The third control valve 135 is opened with the second control valve 134 and the fourth control valve 136 remaining closed. At this time, for example, the negative pressure source 131 is set such that a second pressure sensor 141, which indicates the pressure in the tube connecting the second control valve 134, the third control valve 135, and the fourth control valve 136, is at −30 kPa.

Next, suction is executed in step S13. The first control valve 133 and the third control valve 135 are closed, and only the second control valve 134 is opened. Doing so temporarily reduces the pressure of the discharged material 8, which was previously being controlled to a range at which the meniscus at the discharge port 19 could be maintained, to −30 kPa. The meniscus is then broken by suctioning the gas-liquid mixture from the discharge port 19. At this time, foreign matter present in the discharge port 19 and the small liquid chamber 20 moves into the storage portion 15 along with the gas and liquid.

Next, pressurization preparations are performed in step S14. The second control valve 134 is closed, and only the fourth control valve 136 is opened. At this time, for example, the positive pressure source 132 is set such that the second pressure sensor 141, which indicates the pressure in the tube connecting the second control valve 134, the third control valve 135, and the fourth control valve 136, is at +30 kPa.

Next, in step S15, pressure is applied to the discharged material 8. After closing the fourth control valve 136 and opening only the second control valve 134, the pressure of the positive pressure source 132 is applied to the discharged material 8 through the filling liquid 8*a*, the small liquid chamber 20 is filled with the discharged material 8, and the discharged material 8 is expelled from the discharge port 19.

The pump 44 of the circulating unit 40 is then driven to remove the foreign matter using the filter 41. Alternatively, this removal of foreign matter by the circulating unit 40 may be performed between step S13 and step S14.

The liquid discharge apparatus 10 of the present embodiment is described as performing the cleaning operations in the order of step S12 to step S15. However, the following may be performed instead. First, the first control valve 133 is closed and the second control valve 134 is opened. Then, in the suctioning, the third control valve 135 is opened while the fourth control valve 136 is closed. Then, in the pressurization, the fourth control valve 136 is opened while the third control valve 135 is closed. In this case, a first pressure sensor 140 is temporarily set to −30 kPa during suction and temporarily set to +30 kPa during pressurization.

Additionally, in the liquid discharge apparatus 10 of the present embodiment, the tubes connected from the negative pressure source 131 and the positive pressure source 132 are located higher than the liquid surface in the supply tank 26. However, the tubes can be connected under the liquid surface in the supply tank 26. In other words, the fluid in the tubes is not limited to gas, and can also be a liquid.

Instead of using the third control valve and the fourth control valve, a single three-way valve may be used to fulfill the roles of both.

Note that after step S15, the operations return to step S11, which is the normal, slightly negative pressure state.

Third Embodiment

In the second embodiment, gas was supplied through the tubes connecting the second control valve 134, the third control valve 135, and the fourth control valve 136. In contrast, in the present embodiment, liquid is supplied through the tubes. The internal volume of a gas, which is a compressible fluid, changes, but the internal volume of a liquid, which is an incompressible fluid, changes almost not at all. This results in better responsiveness for the pressure control than when a gas is in the tubes.

Figure 9:
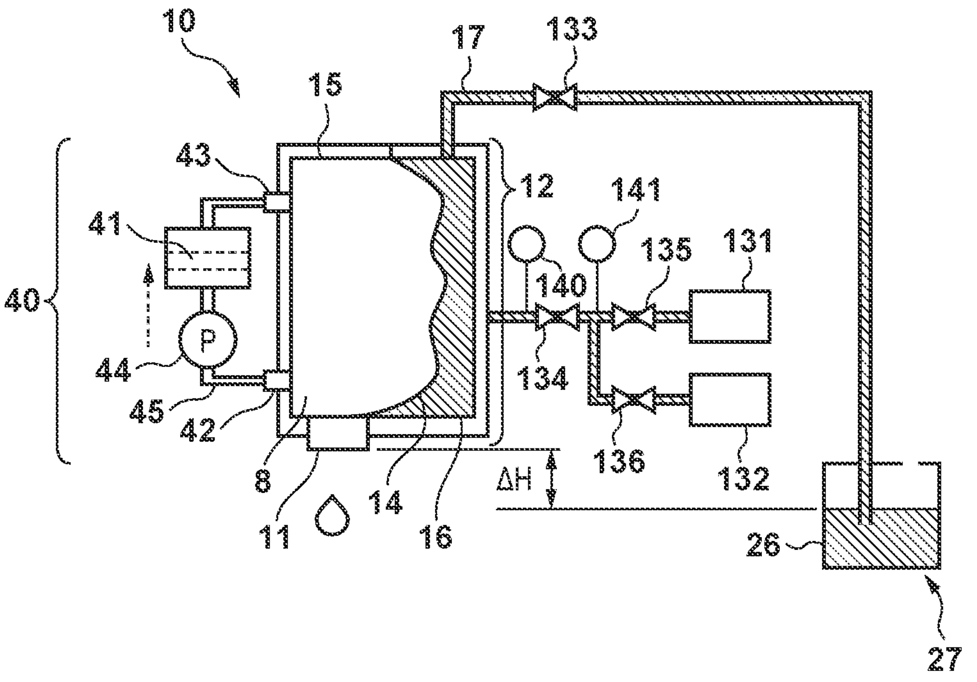
FIG. 9 is a diagram illustrating a pressure control unit according to a third embodiment.

FIG. 9 is a diagram illustrating the configuration of the pressure control unit 13 according to the present embodiment.

In the present embodiment, the negative pressure source 131 and the positive pressure source 132 are disposed in parallel with the meniscus control unit 27, as illustrated in FIG. 9. The first control valve 133 is provided between the meniscus control unit 27 and the storage portion 16. Separate from the meniscus control unit 27, the negative pressure source 131 and the positive pressure source 132 are connected in parallel to the tip of the tube connected to the storage portion 15. The third control valve 135 and the fourth control valve 136 are provided in the negative pressure source 131 and the positive pressure source 132, respectively, and merge at the end. The second control valve 134 is further provided between that end and the storage portion 16.

The role of the first control valve 133 in the present embodiment is the same as in the second embodiment for the purpose of closing the meniscus control unit 27, which maintains the slightly negative pressure state, from a state of being open to the atmosphere, in order to switch between the negative pressure state and the positive pressure state. For the other pressure control units, the only difference is whether the fluid supplied through the tubes is a gas or a liquid, and the basic roles thereof are the same as in the second embodiment.

Accordingly, the flowchart of the cleaning operations is the same as in FIG. 7, which illustrates the operations of the second embodiment.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-027006, filed Feb. 24, 2022, which is hereby incorporated by reference herein in its entirety.

What is claimed is:

1. A liquid discharge apparatus comprising:

a storage portion configured to store a discharged material;

a discharge port configured to communicate with the storage portion and discharge the discharged material stored in the storage portion; and a pressure control device configured to control a pressure of the discharged material stored in the storage portion, wherein the pressure control device controls the pressure of the discharged material to shift from a first negative pressure state, to a second negative pressure state of a greater negative pressure than the first negative pressure state, and then to a third positive pressure state, wherein the pressure control device includes:

a first pressure generation unit configured to produce the first negative pressure state;

a second pressure generation unit configured to be connected to the first pressure generation unit and produce the second negative pressure state; and a third pressure generation unit configured to be connected to the first pressure generation unit and produce the third positive pressure state.

2. The liquid discharge apparatus according to claim 1, wherein the first negative pressure state is a state that produces a negative pressure for maintaining a meniscus of the discharged material in the discharge port.

3. The liquid discharge apparatus according to claim 1, wherein the second negative pressure state is a state that produces a negative pressure greater than a meniscus force of the discharge port.

4. The liquid discharge apparatus according to claim 1, wherein the third positive pressure state is a state that produces a positive pressure for expelling the discharged material from the discharge port.

5. The liquid discharge apparatus according to claim 4, further comprising:

a liquid chamber configured to enable the discharge port and the storage portion to communicate.

6. The liquid discharge apparatus according to claim 1, wherein the first negative pressure state is a state that produces a negative pressure for maintaining a meniscus of the discharged material in the discharge port, the second negative pressure state is a state that produces a negative pressure greater than a meniscus force of the discharge port, and the third positive pressure state is a state that produces a positive pressure for expelling the discharged material from the discharge port.

7. The liquid discharge apparatus according to claim 4, further comprising:

a pump configured to be connected to the storage portion and circulate the discharged material; and a filter configured to filter the discharged material.

8. The liquid discharge apparatus according to claim 1, wherein the pressure control device includes:

a first pressure generation unit configured to produce the first negative pressure state;

a second pressure generation unit configured to be connected to the storage portion independent from the first pressure generation unit and produce the second negative pressure state; and a third pressure generation unit configured to be connected to the storage portion independent from the first and second pressure generation units and produce the third positive pressure state.

9. The liquid discharge apparatus according to claim 8, wherein a first control valve is disposed between the first pressure generation unit and the storage portion, a second control valve is disposed between the second pressure generation unit and the storage portion, and a third control valve is disposed between the third pressure generation unit and the storage portion.

10. The liquid discharge apparatus according to claim 9, wherein the pressure control device forms the second negative pressure state by closing the first control valve and the third control valve and opening the second control valve, and forms the third positive pressure state by closing the first control valve and the second control valve and opening the third control valve.

11. The liquid discharge apparatus according to claim 1, further comprising:

a liquid chamber configured to enable the discharge port and the storage portion to communicate.

12. The liquid discharge apparatus according to claim 1, wherein the first negative pressure state is a state that produces a negative pressure for maintaining a meniscus of the discharged material in the discharge port, the second negative pressure state is a state that produces a negative pressure greater than a meniscus force of the discharge port, and the third positive pressure state is a state that produces a positive pressure for expelling the discharged material from the discharge port.

13. The liquid discharge apparatus according to claim 1, further comprising:

a pump configured to be connected to the storage portion and circulate the discharged material; and a filter configured to filter the discharged material.

14. The liquid discharge apparatus according to claim 1, wherein the second pressure generation unit includes a second tube, the third pressure generation unit includes a third tube, and a first tube into which the second tube and the third tube merge is connected to the first pressure generation unit.

15. The liquid discharge apparatus according to claim 14, wherein a second control valve is provided in the first tube, a third control valve is provided in the second tube, and a fourth control valve is provided in the third tube.

16. The liquid discharge apparatus according to claim 15, wherein the pressure control device forms the second negative pressure state by closing the second control valve and the fourth control valve and opening the third control valve, then closing the third control valve, and then opening the second control valve.

17. The liquid discharge apparatus according to claim 15, wherein the pressure control device forms the third positive pressure state by closing the second control valve and the third control valve and opening the fourth control valve, then closing the fourth control valve, and then opening the second control valve.

18. The liquid discharge apparatus according to claim 14, further comprising:

a first detection device configured to detect a pressure within the first pressure generation unit.

19. The liquid discharge apparatus according to claim 14, further comprising:

a second detection device configured to detect a pressure within the first tube.

20. The liquid discharge apparatus according to claim 1, wherein the pressure control device includes:

a first pressure generation unit configured to produce the first negative pressure state;

a second pressure generation unit configured to be connected to the storage portion independent from the first pressure generation unit and produce the second negative pressure state; and a third pressure generation unit configured to be connected to the storage portion independent from the first pressure generation unit and produce the third positive pressure state.

21. The liquid discharge apparatus according to claim 20, further comprising:

a liquid chamber configured to enable the discharge port and the storage portion to communicate.

22. The liquid discharge apparatus according to claim 20, wherein the first negative pressure state is a state that produces a negative pressure for maintaining a meniscus of the discharged material in the discharge port, the second negative pressure state is a state that produces a negative pressure greater than a meniscus force of the discharge port, and the third positive pressure state is a state that produces a positive pressure for expelling the discharged material from the discharge port.

23. The liquid discharge apparatus according to claim 20, further comprising:

a pump configured to be connected to the storage portion and circulate the discharged material; and a filter configured to filter the discharged material.

24. The liquid discharge apparatus according to claim 20, wherein the second pressure generation unit includes a second tube, the third pressure generation unit includes a third tube, and a first tube into which the second tube and the third tube merge is connected to the storage portion.

25. The liquid discharge apparatus according to claim 24, wherein a second control valve is provided in the first tube, a third control valve is provided in the second tube, and a fourth control valve is provided in the third tube.

26. The liquid discharge apparatus according to claim 24, wherein a liquid is supplied to the first to third tubes.

27. The liquid discharge apparatus according to claim 1, further comprising:

a degassing device configured to degas the discharged material.

28. The liquid discharge apparatus according to claim 1, further comprising:

a collection device configured to collect residual liquid from a discharge surface that includes the discharge port after the third positive pressure state transitions to the first negative pressure state.

29. The liquid discharge apparatus according to claim 1, further comprising:

an anomaly detection device configured to detect an anomaly in discharge from the discharge port.

30. An imprint apparatus comprising:

the liquid discharge apparatus according to claim 1; and a forming device configured to press a mold having a pattern against an imprint material applied to a substrate by the liquid discharge apparatus, and then release the mold from the imprint material after curing the imprint material.

* * * * *